United States Patent [19]

Kono et al.

[11] Patent Number: 5,060,158

[45] Date of Patent: Oct. 22, 1991

[54] APPARATUS FOR CONTROLLING CLUTCHES

[75] Inventors: Hiromi Kono; Masuhiro Ohtsuka, both of Hagashimatsuyama, Japan

[73] Assignee: Diesel Kiki Co., Ltd., Tokyo, Japan

[21] Appl. No.: 411,983

[22] Filed: Sep. 25, 1989

[30] Foreign Application Priority Data

Sep. 27, 1988 [JP]  Japan ................. 63-126140[U]

[51] Int. Cl.$^5$ ............................................. B60K 41/28
[52] U.S. Cl. ........................... 364/424.1; 192/0.076; 192/3.58
[58] Field of Search ............... 364/424.1; 192/0.032, 192/0.052, 0.056, 0.072, 0.076, 3.58

[56] References Cited

U.S. PATENT DOCUMENTS

| | | | |
|---|---|---|---|
| 4,561,530 | 12/1985 | Parsons et al. | 192/0.076 |
| 4,591,038 | 5/1986 | Asagi et al. | 192/0.076 |
| 4,662,494 | 5/1987 | Wakiya et al. | 192/0.052 |
| 4,671,397 | 6/1987 | Asagi et al. | 192/0.052 |
| 4,718,525 | 1/1988 | Yamaguchi | 192/0.052 |
| 4,722,429 | 2/1988 | Kono | 192/0.076 |
| 4,765,450 | 8/1988 | Kurihara et al. | 192/0.052 |
| 4,766,544 | 8/1988 | Kurihara et al. | 364/424.1 |
| 5,005,687 | 4/1991 | Kurihara et al. | 364/424.1 |

Primary Examiner—Salvatore Cangialosi
Attorney, Agent, or Firm—Pollock, Vande Sande & Priddy

[57] ABSTRACT

A clutch control apparatus for controlling the operation of a friction type clutch comprises a data generator responsive to an engaging command signal for generating an electric signal corresponding to the time-course in a target clutch stroke pattern for engaging the clutch. The actual clutch stroke of the clutch is adjusted by the use of a clutch actuator coupled with the clutch in response to the electric signal in such a way that the actual clutch stroke is made to coincide with the target clutch stroke at each instant, whereby the actual clutch stroke varies in accordance with the desired time-course pattern for engaging the clutch after the application of the engaging command signal. The initial target clutch stroke of the desired pattern may be corrected in accordance with the amount of operation of an acceleration member to reduce the dead time in the torque transmission through the clutch.

17 Claims, 4 Drawing Sheets

APPARATUS FOR CONTROLLING CLUTCHES

BACKGROUND OF THE INVENTION

The present invention relates to an apparatus for controlling clutches, and more particularly to a clutch control apparatus which is capable of automatically and smoothly controlling the engaging operation of friction type clutches.

A clutch control apparatus for automatically controlling the engaging/disengaging operation of a friction type clutch has been employed in, for example, electronically controlled automatic transmission systems for vehicles. There are known prior art clutch control apparatuses of the type described above which are adapted to engage a friction type clutch at a speed corresponding to the engine speed in order to engage the clutch smoothly. However, in the conventional arrangement the time required for operating the clutch during a gear-shifting operation becomes longer if the clutch engagement speed is selected so as to reduce the shock of the clutch engagement at vehicle starting. Disadvantageously, therefore, more time is often required for gear-shift operations.

For eliminating this disadvantage, Japanese Patent Public Disclosure No. 60-11766(11766/85) discloses a clutch control system in which it is discriminated whether the clutch is being operated for a vehicle starting operation or for a gear-shift operation and the clutch engagement speed is controlled in accordance with the degree of depression of the accelerator pedal in the case where the clutch is operated for gear-shift operation. Since the disclosed apparatus is arranged so as to change the clutch engagement speed in accordance with the amount of operation of the accelerator pedal, the time required for engaging the clutch can be changed in response to the amount of operation of the accelerator pedal.

However, in the case where the clutch engagement speed is controlled as stated above, it is necessary to calculate the speed data for each clutch stroke position when fine clutch stroke control is required in the semi-engaged zone, so that the data processing becomes complex. In particular, in the case where the clutch engagement speed is relatively high, it is impractical to stop the operation of the clutch to obtain the desired clutch stroke state accurately since the data desired for the control may be scattered because of the time delay in the detection of the clutch stroke.

Furthermore, when the clutch engagement speed is controlled in accordance with the amount of operation of the accelerator pedal, there is another disadvantage that it is difficult to eliminate the dead time during which significant torque transmission is not realized through the clutch after the start of the operation for engaging the clutch. The off condition of the torque transmission due to the dead time will cause incompatibility between the vehicle acceleration expected by the driver and the actual operation of the accelerator pedal by the driver, especially when the accelerator pedal is quickly depressed.

SUMMARY OF THE INVENTION

An object of the present invention is to provide an improved clutch control apparatus which is able to eliminate the above-described disadvantages in the prior art.

Another object of the present invention is to provide a clutch control apparatus capable of smoothly controlling the operation of a clutch with high accuracy.

A further object of the present invention is to provide a clutch control apparatus which is capable of reducing the dead time of torque transmission through the clutch just after the start of the operation for engaging the clutch.

According to the present invention, a clutch control apparatus for controlling the operation of a friction type clutch in response to an engaging command signal comprises a data generating means responsive to the engaging command signal for generating an electric signal corresponding to the time-course in a target clutch stroke pattern for engaging the clutch. The electric signal may be compared with a signal showing the actual clutch stroke of the clutch, which is produced from a stroke detecting means, and the actual clutch stroke is adjusted by the use of a clutch actuator coupled with the clutch in response to the result of the comparison in such a way that the actual clutch stroke is made to coincide with the target clutch stroke at each instant. Thus, the actual clutch stroke varies in accordance with the desired time-course pattern for engaging the clutch after the application of the engaging command signal, whereby the torque transmission through the clutch is effectively controlled. Accordingly, the clutch can be engaged smoothly and accurately. The stroke of the clutch may be controlled in accordance with the electric signal from the data generating means in the open-loop control mode. Furthermore, the pattern for engaging the clutch may, for example, be selected from among a plurality of patterns prepared in advance.

In one preferred embodiment, the data generating means is arranged to generate a series of digital data which represent a discrete target clutch stroke value for each instant during the operation for engaging the clutch, in accordance with the desired pattern of time-course in the target clutch stroke.

Another feature of the present invention is that a correcting means is provided for correcting at least the initial target clutch stroke of the desired pattern for engaging the clutch according to the electric signal from the data generating means in accordance with the amount of operation of an acceleration member for an internal combustion engine coupled with the clutch. Thus, the dead time in the torque transmission through the clutch is shortened when engaging the clutch. Furthermore, incompatibility between the response expected by the driver for a given operation of the accelerating member and the actual acceleration of the load (for example, a vehicle) can be suppressed during engagement of the clutch.

The invention will be better understood and other objects and advantages thereof will be more apparent from the following detailed description of preferred embodiments with reference to the accompanying drawings.

DESCRIPTION OF THE PREFERRED EMBODIMENTS

Figure 1:
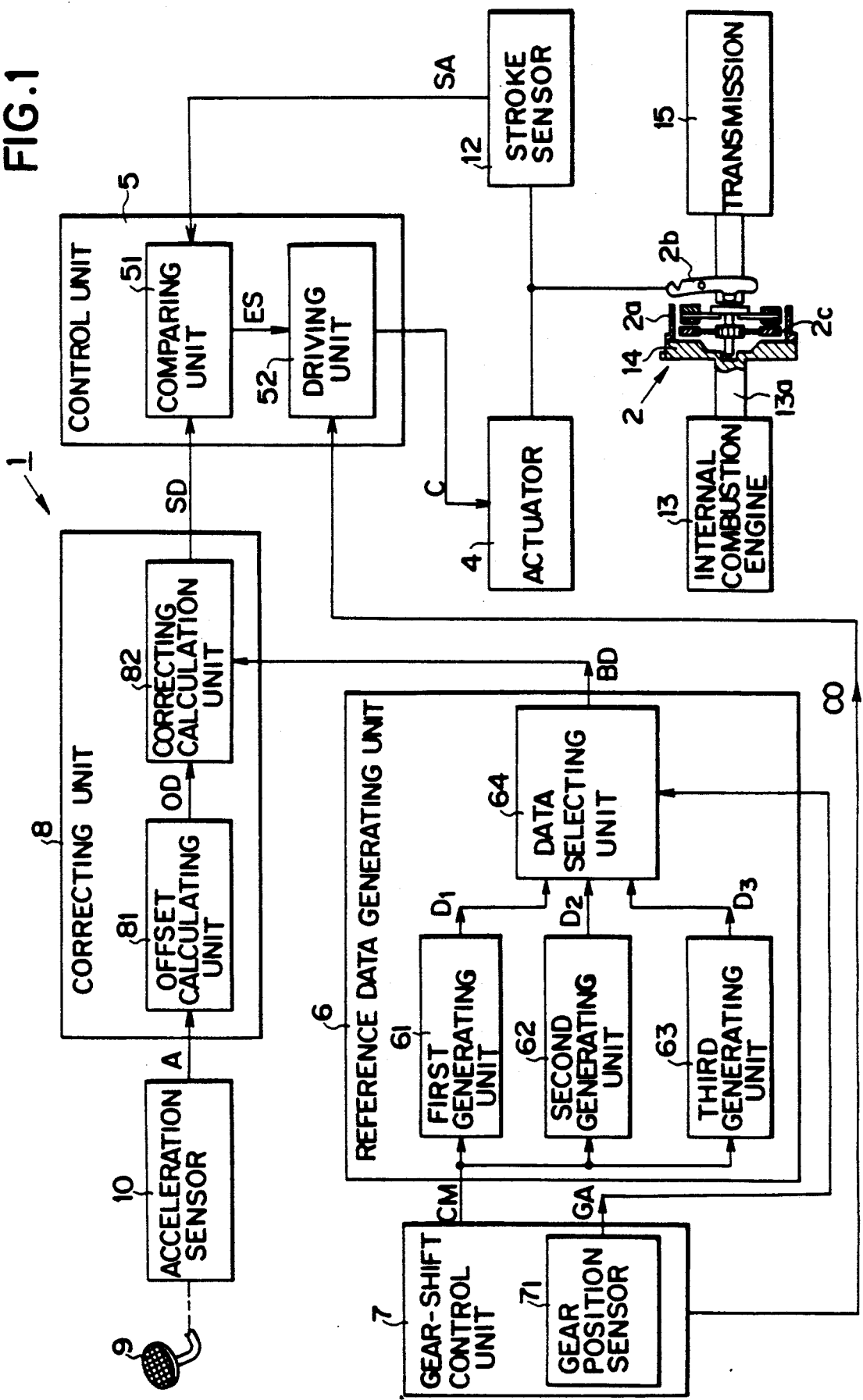
FIG. 1 is a view schematically showing an embodiment of a clutch control apparatus according to the present invention for a vehicle powered by an internal combustion engine.

FIG. 1 shows an embodiment of a clutch control apparatus according to the present invention, which is adapted to control the engaging/disengaging of a vehicle clutch. A clutch 2 controlled by a clutch control apparatus 1 according to the present invention is a friction type clutch of well-known design. The clutch 2 is mounted on a fly-wheel 14 secured on an output shaft 13a of an internal combustion engine 13, and the output side of the clutch 2 is coupled with a transmission 15 which is automatically operated by a gearshift control unit 7. An actuator 4 operated in response to a control signal C from a control unit 5 is coupled with a release lever 2b for adjusting the position of a pressure plate 2a of the clutch 2. The distance between the pressure plate 2a and an associated clutch plate 2c is adjusted by the actuator 4 so as to regulate the condition of engagement of the clutch 2. In this specification, the position of the pressure plate 2a is referred to as the "clutch stroke". The clutch stroke ST is zero when the pressure plate 2a is in contact with the clutch plate 2c with a predetermined pressure. The clutch stroke ST increases as the pressure plate 2a departs from the clutch plate 2c, and the clutch stroke ST finally reaches its maximum value Sm.

Reference numeral 6 designates a reference data generating unit which receives an engaging command signal CM from the gear-shift control unit 7 immediately after a gearshift operation in the transmission 15 has been completed. The reference data generating unit 6 is responsive to the engaging command signal CM and generates an electric signal corresponding to time-course changes in a target clutch stroke pattern to be followed during clutch engagement. In this embodiment, in response to the application of the engaging command signal CM, the reference data generating unit 6 generates a series of digital data as reference data defining a time-course pattern of the target clutch stroke after the operation for engaging the clutch starts. The series of digital data constitutes reference data BD formed from data representing discrete target clutch stroke values $St_1$, $St_2$, $St_3$, ... of the clutch 2 at individual instants between the start of the engagement of the clutch 2 and the time at which the completely engaged state $ST=0$ of the clutch 2 is attained.

The reference data generating unit 6 has a first generating unit 61 for generating first data $D_1$ representing a pattern for engaging the clutch 2 in the case where the transmission 15 is in the first gear position, a second generating unit 62 for generating second data $D_2$ representing a pattern for engaging the clutch 2 in the case where the transmission 15 is the second gear position, and a third generating unit 63 for generating third data $D_3$ representing a pattern for engaging the clutch 2 in the case where the transmission 15 is in the third gear position. The first to third generating units 61 to 63 receive the engaging command signal CM and in response immediately generate the respective data $D_1$ to $D_3$.

Figure 2:
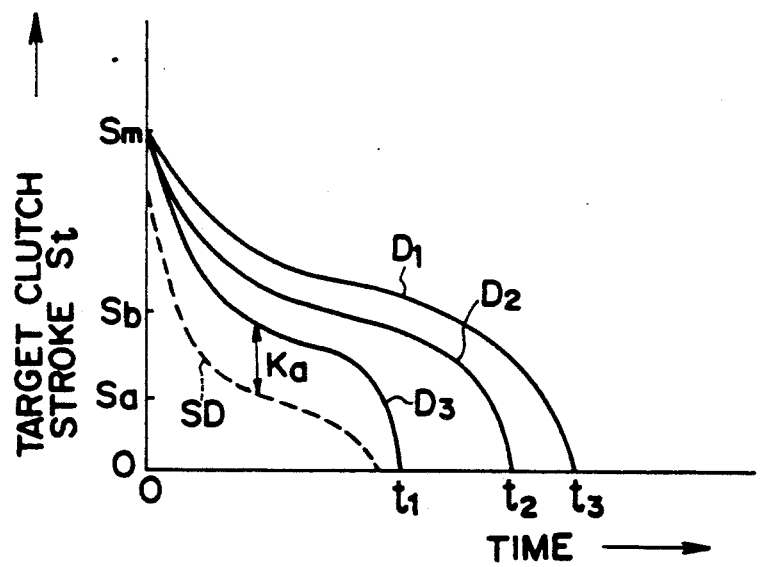
FIG. 2 is a graph showing the characteristics of clutch engagement patterns used in the apparatus shown in FIG. 2.

FIG. 2 shows the characteristics of the respective patterns for engaging the clutch according to the data $D_1$ to $D_3$. Time $t=0$ is the point of time at which engagement of the clutch 2 is begun. The target clutch stroke value St at $t=0$ is Sm in all three patterns. The target clutch strokes St in the patterns represented by the data $D_1$, $D_2$ and $D_3$ becomes zero at times $t_1$, $t_2$ and $t_3$, respectively. As described above, the data $D_1$, $D_2$ and $D_3$ represent target patterns of the clutch stroke St to be followed during the engagement of the clutch 2. In each case the target clutch stroke St changes from Sm to zero. Each of the first to third generating units 61 to 63 may be composed of a memory for storing a series of digital data and a read-out unit for reading out the data stored in the memory in sequence at suitable time intervals in response to the application of the engaging command signal CM. The clutch 2 is in a semi-engaged state in the range of $Sa < St < Sb$.

The first to third data $D_1$ to $D_3$ are input to a data selecting unit 64 to which an actual gear position signal GA indicating the actual gear position in the transmission 15 is applied from a gear position sensor 71 of the gear-shift control unit 7. The data selecting unit 64 selects one set of data from among the first to third data sets $D_1$ to $D_3$ in accordance with the actual gear position signal GA and the data selected by the data selecting unit 64 is supplied as reference data BD to a correcting unit 8.

The correcting unit 8 is responsive to an acceleration signal A produced from an acceleration sensor 10 for detecting the amount of operation of an accelerator pedal 9 coupled with the internal combustion engine 13 by means of a linkage mechanism (not shown), and is for offsetting the reference data BD in accordance with the amount of operation of the accelerator pedal 9 shown by the acceleration signal A. The correcting unit 8 has an offset calculating unit 81 for calculating the necessary magnitude of the offset on the basis of the acceleration signal A.

Figure 3:
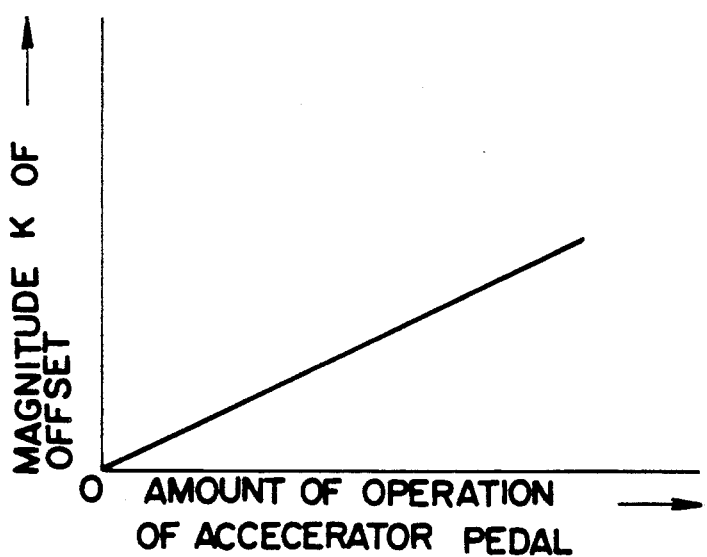
FIG. 3 is a graph showing the relationship between an offset value calculated in an offset calculating unit shown in FIG. 1 and the amount of operation of an accelerator pedal shown in FIG. 1.

In this embodiment, the necessary magnitude K of the offset for the reference data BD is calculated by the offset calculating unit 81 on the basis of the acceleration signal A in accordance with the relationship shown in FIG. 3. Offset data OD showing the calculated magnitude K of the offset is supplied to a correcting calculation unit 82.

The magnitude K of the offset shown by the offset data OD is subtracted from each member of the set of reference data BD in the correcting calculation unit 82, and the resulting set of target stroke data SD is supplied to a comparing unit 51 of the control unit 5.

Therefore, in the case where, for example, the third data $D_3$ is selected as the reference data BD and value Ka is decided as the offset magnitude K, the target clutch stroke St according to the target stroke data SD supplied to the control unit 5 varies after $t=0$ as indicated by the broken line in FIG. 2. That is, the clutch stroke Sm-Ka is given as the initial target clutch stroke in response to the application of the engaging command signal CM. After this, the target clutch stroke St at each instant is determined in accordance with the characteristics shown by the broken line.

An actual stroke signal SA indicating the actual clutch stroke ST of the clutch 2 is applied to the comparing unit 51 from a stroke sensor 12 coupled with the release lever 2b, and the actual stroke signal SA is compared with the target stroke data SD to detect the difference between the actual clutch stroke ST and the target clutch stroke St. Thus, an error signal ES showing the difference between ST and St is produced by the comparing unit 51 and supplied to driving unit 52.

The driving unit 52 is of known design and produces a pulse signal as the control signal C. The duty cycle of the control signal C is determined on the basis of the error
signal ES, and the position of the release lever 2b is regulated by the actuator 4 in accordance with the control signal C as described above.

A clutch off signal CO for commanding disengagement of the clutch 2 is supplied to the driving unit 52 from the gear-shift control unit 7. The actuator 4 is responsive to
the clutch off signal CO to disengage the clutch 2 by operating the release lever 2b at a predetermined speed.

With the arrangement described above, a suitable reference data BD for the actual gear position at that time is generated from the reference data generating unit 6 in response to the application of the engaging command signal CM from the gear-shift control unit 7. Furthermore, the value of the offset magnitude K is determined by the offset calculating unit 81 in accordance with the amount of operation of the accelerator pedal 9 on the basis of the characteristic curve shown in FIG. 3. The reference data BD is corrected by the correcting calculation unit 82 in accordance with the magnitude of the offset indicated by the offset data OD.

Thus, the pattern for engaging the clutch 2 varies in accordance with the amount of operation of the accelerator pedal 9. Since the pattern for engaging the clutch 2 is changed by offsetting the target clutch stroke based on the reference data BD, the initial target stroke, that is, the value So of the target clutch stroke at $t=0$ becomes less so that less time is necessary for changing the state of the clutch 2 from its predetermined initial stroke to its complete engaged state ($ST=0$) when the amount of the operation of the accelerator pedal 9 becomes greater.

Therefore, when the amount of depression of the accelerator pedal 9 is large, the dead time of the torque transmission by the clutch 2 becomes less and less time is required for obtaining the completely engaged state of the clutch 2 after the start of the engaging operation. As a result, the vehicle accelerates briskly so that the actual acceleration is well matched to that expected by the driver in response to his driving operation. There is thus no feeling of incompatibility.

Since the clutch 2 is controlled to be engaged in accordance with the target clutch stroke based on the reference data BD generated by the reference data generating unit 6, it is possible to obtain high accuracy control. In general, since the relationship between the stroke and the transmission torque of the clutch is not linear, it is difficult to control the transmission torque in the clutch by controlling the speed of the operation for engaging the clutch. However, since the clutch stroke is controlled in the apparatus 1 on the basis of the relationship between the time t and the target clutch stroke St, the transmission torque in the clutch can be easily controlled. Consequently, the clutch is effectively prevented from assuming an overslip condition and smooth and accurate engaging operation can be performed without occurrence of mechanical shock.

The description of the present invention has so far been made on the basis of one embodiment shown in FIG. 1. However, the present invention is not limited to only the arrangement of the clutch control apparatus 1 shown in FIG. 1. For example, the reference data generating unit 6 may be modified in such a way that only one generating unit is made operative in accordance with the actual gear position signal GA to obtain a suitable reference data BD. In this case, there is no need for the data selecting unit 64. Furthermore, the correcting unit 8 may be arranged in such a way that an offset coefficient is determined on the basis of the amount of operation of the accelerator pedal 9 and the reference data BD is corrected by multiplying the target clutch stroke according to the reference data BD by the coefficient.

Figure 4:
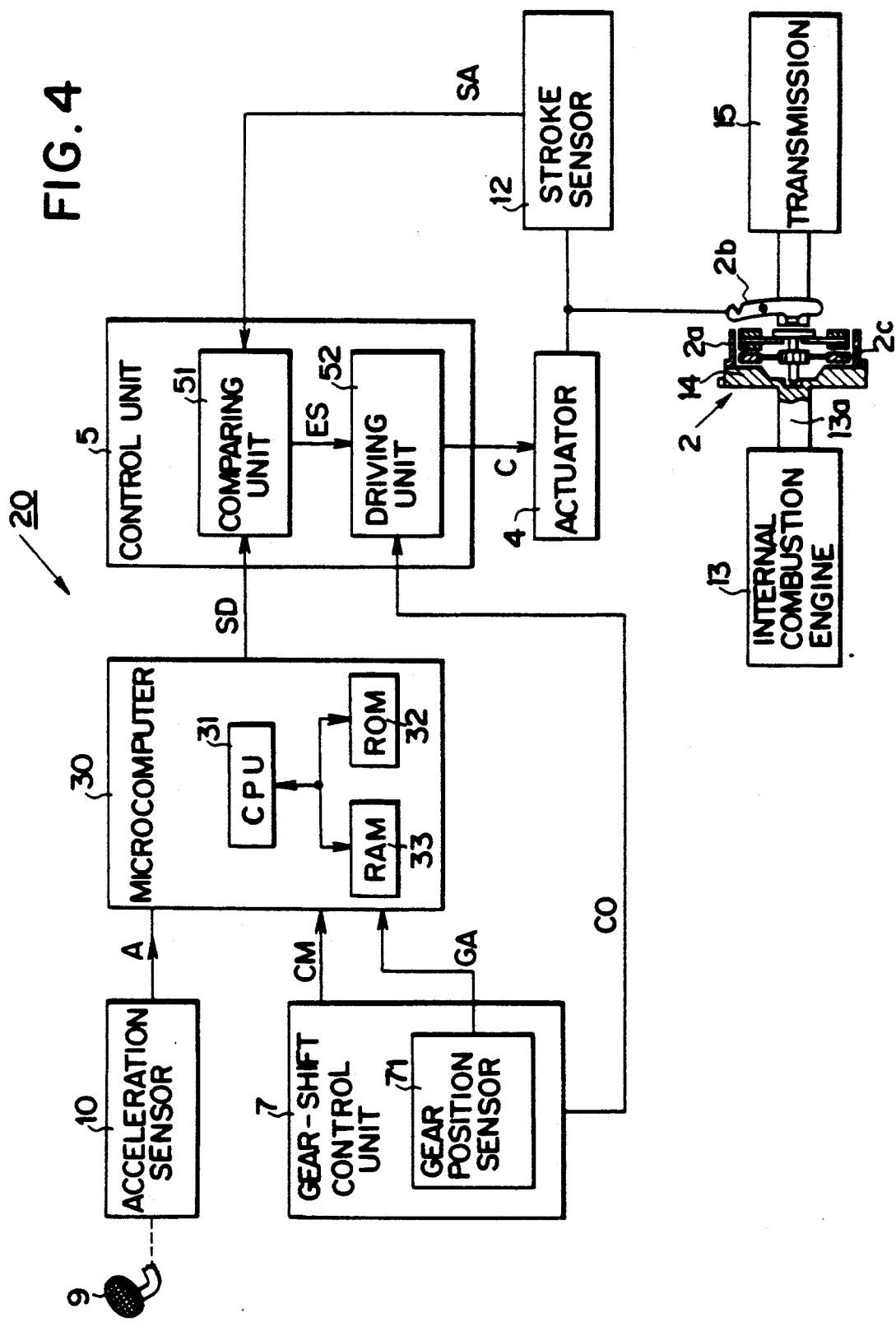
FIG. 4 is a view schematically showing another embodiment of a clutch control apparatus according to the present invention.

FIG. 4 shows another embodiment of a clutch control apparatus according to the present invention. The clutch control apparatus 20 shown in FIG. 4 is different from the clutch control apparatus 1 shown in FIG. 1 in that a data processing operation based on a given computer program is executed by a microcomputer 30 in response to a predetermined signal to produce the target stroke data SD. Since the apparatus 20 is arranged similarly to the apparatus 1 except for the point described above, the portions of FIG. 4 corresponding to those of FIG. 1 are designated by the same references and no explanation will be given thereof.

Referring to FIG. 4, the microcomputer 30 is of well-known design and has a central processing unit (CPU)31, a read-only memory (ROM)32, and a random-access memory (RAM)33. The microcomputer 30 is responsive to the acceleration signal A, the engaging command signal CM and the actual gear position signal GA to produce the target stroke data SD by executing a data processing program stored in the ROM 32.

Figure 5:
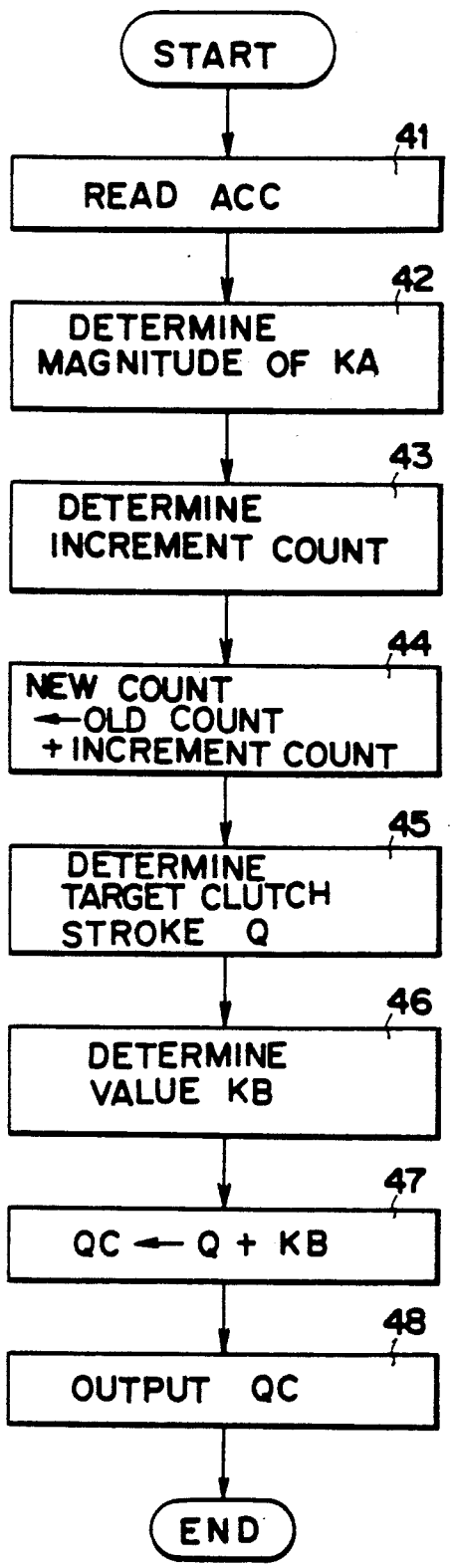
FIG. 5 is a flowchart representing a data processing program executed in a microcomputer shown in FIG. 4.

FIG. 5 is a flowchart showing the data processing program executed in the microcomputer 30. The execution of the data processing program starts when the engaging command signal CM is applied to the microcomputer 30, and then the program is repeatedly executed at regular intervals, for example, every 8 (ms). After the start of the execution, in step 41 data ACC representing the amount of operation of the accelerator pedal 9 at that time is read into the RAM 33 in response to the acceleration signal A. Then, a compression coefficient KA is calculated in accordance with the data ACC in step 42.

A set of reference pattern data corresponding to the first data $D_1$, explained earlier with reference to FIG. 2 is stored in advance in the ROM 32, and the time axis of the reference pattern data is compressed in accordance with the coefficient KA so as to obtain desired pattern data.

Figure 6:
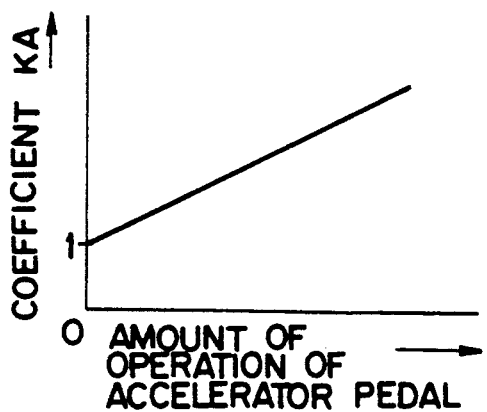
FIGS. 6 to 8 are graphs, each of which shows a characteristic curve used for calculations carried out in prescribed steps of the flowchart of FIG. 5.

FIG. 6 is a graph showing the relationship between the magnitude of the coefficient KA and the amount of the operation of the accelerator pedal 9, and the magnitude of the coefficient KA is calculated in step 42 on the basis of data ACC in accordance with the relationship shown in FIG. 6.

Figure 7:
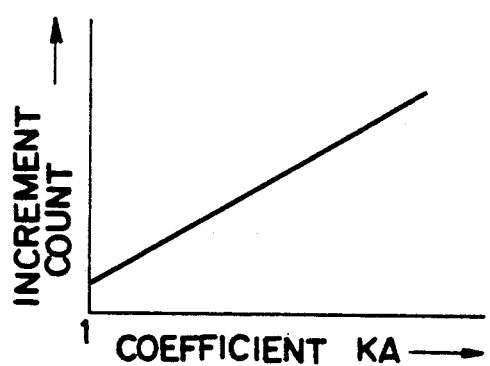

In step 43, an increment count corresponding to the coefficient KA is determined on the basis of the characteristics shown in FIG. 7. The count of a counter for producing read-out address data for reading out the reference pattern data from the ROM 32 is incremented by the increment count at that time.

In step 44 the increment count is added to the old count set in the counter and the resulting sum is set as a new count in the counter. The operation then moves to step 45 wherein the target clutch stroke is determined on the basis of the new count of the counter. That is, the count of the counter corresponds to the time in FIG. 2, and the target clutch stroke at that time can be read out from the ROM 32 by applying the count as read-out address data to the ROM 32.

Figure 8:
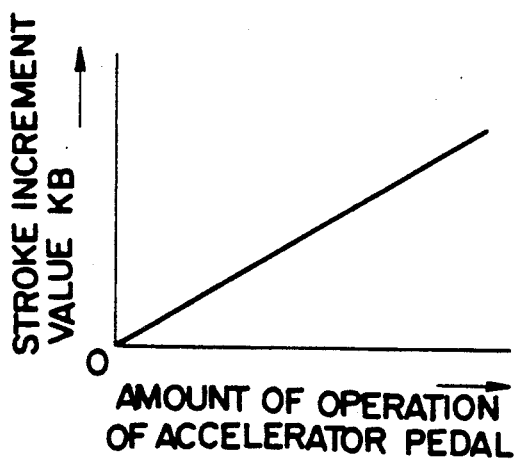

After this, the operation moves to step 46, wherein the stroke increment value KB corresponding to the magnitude of the offset described with reference to FIG. 1 is determined in accordance with data ACC on the basis of the characteristic data of FIG. 8 showing the relationship between the amount of operation of the accelerator pedal 9 and the stroke increment value KB. In step 47 the stroke increment value KB obtained in step 46 is added to the value Q of the target clutch stroke Q determined in step 45 and the resulting sum is set as the target clutch stroke QC at that time. In step 48 the target clutch stroke QC is output as the output of the microcomputer 30.

Steps 41 to 48 are repeatedly executed at regular intervals and the target clutch stroke QC is output at every execution of the program. A series of target clutch strokes QC is supplied as the target clutch stroke data SD to the control unit 5, and the clutch stroke of the clutch 2 is controlled by the control unit 5 in a closed-loop control mode in accordance with the pattern corrected by the amount of operation of the accelerator pedal 9. Consequently, engagement of the clutch 2 can be smoothly and accurately controlled.

In the clutch control apparatus 20 shown in FIG. 4, in addition to carrying out offset correction of the reference pattern data by the stroke increment value BK in a manner similar to that in the clutch control apparatus 1 shown in FIG. 1, the speed of the operation for engaging the clutch 2 is changed in response to the amount of operation of the accelerator pedal 9 by correcting the count of the counter in accordance with the coefficient KA. As a result, the driver's impression regarding the engagement of the clutch and his impression regarding the acceleration of the vehicles are very close to the results he expected from the operation of the accelerator pedal.

The clutch control apparatus 20 shown in FIG. 4 may be modified so that a part or all of the functions of the control unit 5 are performed in the microcomputer 30.

We claim:

1. A clutch control apparatus for controlling the operation for engaging a friction type clutch in response to an engaging command signal, said apparatus comprising:

an actuating means for operating said clutch;
a data generating means responsive to the engaging command signal for generating an electrical signal representing time course changes in a target clutch stroke pattern;
a stroke detecting means for detecting an actual clutch stroke of said clutch; and
a control means responsive to said data generating means and said stroke detecting means for controlling said actuating means to make the difference between a target clutch stroke and the actual clutch stroke substantially zero, whereby the actual clutch stroke is changed in accordance with said pattern.

2. A clutch control apparatus as claimed in claim 1, wherein the electric signal from said data generating means is a series of digital data representative of discrete target clutch strokes in a stroke region for effecting a control operation for engaging said clutch, the digital data being output sequentially after the receipt of the engaging command signal.

3. A clutch control apparatus as claimed in claim 1, wherein said data generating means comprises memory means in which a series of digital data representative of discrete target clutch strokes in a stroke region for effecting a control operation for engaging said clutch is stored, and means responsive to the engaging command signal for producing read-out address data for reading out the digital data from said memory means sequentially.

4. A clutch control apparatus for controlling the operation for engaging a friction type clutch provided between an internal combustion engine and a transmission, said apparatus comprising:

an actuating means for operating said clutch;
a data generating means responsive to an engaging command signal for generating an electric signal representing time course changes in a target clutch stroke pattern;
a stroke detecting means for detecting an actual clutch stroke of said clutch; and
a control means responsive to said data generating means and said stroke detecting means for controlling said actuating means to make the difference between a target clutch stroke and the actual clutch stroke substantially zero, whereby the actual clutch stroke is changed in accordance with said pattern.

5. A clutch control apparatus as claimed in claim 4, wherein the electric signal from said data generating means is a series of digital data representative of discrete target clutch strokes in a stroke region for effecting a control operation for engaging said clutch; and wherein said digital data is output sequentially after the receipt of the engaging command signal.

6. A clutch control apparatus as claimed in claim 4, wherein said data generating means is for generating a plurality of electric signals each corresponding to a different target clutch stroke pattern; and wherein one of the electric signals is output from said data generating means.

7. A clutch control apparatus as claimed in claim 6, wherein said apparatus further comprises means for generating a position signal corresponding to an actual gear-shift position of said transmission; and wherein one of the electric signals is selected in accordance with the position signal.

8. A clutch control apparatus as claimed in claim 4, wherein said data generating means has at least one memory means in which a series of digital data representative of discrete target clutch strokes in a stroke region for effecting a control operation for engaging said clutch is stored.

9. A clutch control apparatus as claimed in claim 4, wherein said data generating means comprises a plurality of memory means each having stored therein a series of digital data representative of one of different target clutch stroke patterns in a stroke region for effecting a control operation for engaging said clutch.

10. A clutch control apparatus as claimed in claim 9, wherein said apparatus further comprises means for generating a position signal representative of an actual gear-shift position of said transmission; and wherein a series of digital data is selected in accordance with the position signal.

11. A clutch control apparatus for controlling the operation for engaging a friction type clutch coupled with an internal combustion engine in response to an engaging command signal, said apparatus comprising:
an actuating means for operating said clutch;
a data generating means responsive to the engaging command signal for generating an electric signal representing time course changes in a target clutch stroke pattern;
an acceleration detecting means for detecting the amount of operation of an acceleration member associated with said internal combustion engine;
a correcting means responsive to said acceleration detecting means for correcting the electric signal in accordance with the amount of operation of said acceleration member to obtain a corrected target clutch stroke;
a stroke detecting means for detecting an actual clutch stroke of said clutch; and
a control means responsive to said correcting means and said stroke detecting means for controlling said actuating means to make the difference between the corrected target clutch stroke and the actual clutch stroke substantially zero.

12. A clutch control apparatus as claimed in claim 11, wherein said electric signal from said data generating means is a series of digital data representing discrete target clutch strokes in a stroke region for effecting a control operation for engaging said clutch; and wherein the digital data is output sequentially after the receipt of the engaging command signal.

13. A clutch control apparatus as claimed in claim 11, wherein said correcting means comprises means responsive to said acceleration detecting means for determining correction data, and means for changing the magnitude of the electric signal in accordance with the correction data.

14. A clutch control apparatus as claimed in claim 12, wherein said correcting means comprises means responsive to said acceleration detecting means for determining correction data, and means for changing the magnitude of the respective digital data by a predetermined amount according to the correction data.

15. A clutch control apparatus as claimed in claim 11, wherein said data generating means comprises memory means in which a series of digital data showing discrete target clutch strokes in a stroke region for effecting a control operation for engaging said clutch is stored.

16. A method of controlling the operation for engaging a friction type clutch coupled with an internal combustion engine in response to an engaging command signal, said method comprising steps of:
detecting the amount of operation of an acceleration member associated with said internal combustion engine;
reading out from a memory means a series of digital data representative of discrete target clutch strokes in a stroke region for effecting a control operation for engaging said clutch in response to the engaging command signal at a time interval determined in accordance with the amount of operation of the acceleration member detected in said detecting step;
sensing an actual clutch stroke of said clutch; and
controlling the actual clutch stroke of said clutch to substantially equal the target clutch stroke represented by the digital data at the time interval determined in response to the engaging command signal and the actual clutch stroke obtained in the sensing step.

17. A method as claimed in claim 16, wherein the initial digital data read out from the memory means in response to the engaging command signal is dependent upon the amount of operation of the acceleration member.

* * * * *